US010496393B2

(12) United States Patent
Okuyama et al.

(10) Patent No.: US 10,496,393 B2
(45) Date of Patent: Dec. 3, 2019

(54) PROGRAM UPDATE CONTROL SYSTEM AND PROGRAM UPDATE CONTROL METHOD

(71) Applicant: Mitsubishi Electric Corporation, Tokyo (JP)

(72) Inventors: Hiroshi Okuyama, Tokyo (JP); Toshinori Matsui, Tokyo (JP); Hiroyuki Saito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/795,399

(22) Filed: Oct. 27, 2017

(65) Prior Publication Data

US 2018/0136924 A1    May 17, 2018

(30) Foreign Application Priority Data

Nov. 16, 2016  (JP) ................................. 2016-222908

(51) Int. Cl.
  *G06F 8/65*   (2018.01)
  *G06F 21/57*   (2013.01)

(52) U.S. Cl.
  CPC ................ *G06F 8/65* (2013.01); *G06F 21/57* (2013.01)

(58) Field of Classification Search
  None
  See application file for complete search history.

(56) References Cited

U.S. PATENT DOCUMENTS 5,828,977 A * 10/1998 Hayashi ................ F02D 41/042
                                                    701/115
6,202,207 B1 * 3/2001 Donohue .................. G06F 8/65
                                                    705/59
(Continued)

FOREIGN PATENT DOCUMENTS

JP    2007-230317 A    9/2007
JP    2010-243339 A    10/2010
(Continued)

OTHER PUBLICATIONS

De Boer, "Generic Remote Software Update for Vehicle ECUs Using a Telematics Device as a Gateway", 2005, Advanced Microsystems for Automotive Applications 2005 pp. 371-380, Part of the Advanced Microsystems for Automotive Applications 2005 book series (VDI-BUCH) (Year: 2005).*

*Primary Examiner* — Hossain M Morshed
(74) *Attorney, Agent, or Firm* — Sughrue Mion, PLLC; Richard C. Turner

(57) ABSTRACT

A first control device includes a data processing controller that generates and transfers information indicating a current operating condition of the first control device and information indicating a current operating condition of a vehicle, and transfers a most recent version of a security program, to which the program is to be updated, to a second control device, while the second control device, having received the most recent version of the security program from the first control device, specifies the current operating condition of the vehicle on the basis of the information obtained from the first control device, and when the specified current operating condition matches a vehicle operating condition in which processing for updating the program to the most recent
(Continued)

version of the security program is possible, executes processing for updating the program to the most recent version of the security program.

8 Claims, 5 Drawing Sheets

(56) References Cited

U.S. PATENT DOCUMENTS

| | | | | |
|---|---|---|---|---|
| 7,698,700 | B2* | 4/2010 | Armstrong | G06F 8/656 |
| | | | | 717/169 |
| 2009/0300595 | A1* | 12/2009 | Moran | G06F 8/65 |
| | | | | 717/170 |
| 2015/0309784 | A1* | 10/2015 | Molin | G06F 8/65 |
| | | | | 701/71 |
| 2017/0024201 | A1* | 1/2017 | Diedrich | G06F 8/65 |
| 2018/0155901 | A1* | 6/2018 | Iwasaki | B60R 16/02 |
| 2018/0246712 | A1* | 8/2018 | Aizawa | E02F 9/2095 |
| 2019/0050294 | A1* | 2/2019 | Ferzli | G06F 11/1433 |

FOREIGN PATENT DOCUMENTS

| | | |
|---|---|---|
| JP | 2014-106875 A | 6/2014 |
| JP | 2014-168219 A | 9/2014 |

* cited by examiner

PROGRAM UPDATE CONTROL SYSTEM AND PROGRAM UPDATE CONTROL METHOD

BACKGROUND OF THE INVENTION

1. Field of the Invention

This invention relates to a program update control system and a program update control method for updating a program that realizes a security function for preventing incorrect operations from being implemented on a control device installed in a vehicle.

2. Description of the Related Art

A vehicle is installed with a plurality of control devices known as electronic control units (ECUs), and the ECUs are connected to each other by a wireless or wired in-vehicle network.

The ECUs respectively execute programs corresponding to functions allocated thereto. The programs may be rewritten to updated versions of the programs supplied to the vehicle by a service station or the like over a wire, or to updated versions of the programs distributed from a service center that communicates with the vehicle wirelessly.

In a conventional technique, when a program rewrite request is issued, an overall control device stops the vehicle and then transfers a program update transmitted from a service terminal connected thereto via a network to a subject control device (see Japanese Patent Application Publication No. 2007-230317, for example).

SUMMARY OF THE INVENTION

However, when the technique described in this prior art document is applied, the following problem arises.

In any ECU, a program for ensuring security against incorrect operations may be updated simply when an engine of the vehicle is stopped or the engine is operated while the vehicle is parked. In this case, a security measure (a theft prevention device, for example) required at that time does not function, and as a result, the vehicle is exposed to a security risk such as theft while the program is updated.

This invention has been designed to solve the problem described above, and an object thereof is to obtain a program update control system and a program update control method with which a program for realizing a security function against incorrect operations in an in-vehicle network system can be updated at an appropriate timing corresponding to a characteristic of an ECU.

A program update control system according to this invention is applied to a vehicle installed with a first control device and one or more second control devices connected communicably to the first control device in order to perform update processing on a security program that is implemented in the second control device for the purpose of preventing incorrect operations, wherein: the first control device comprises a data processing controller that generates information indicating a current operating condition of the first control device and information indicating a current operating condition of the vehicle on the basis of data detected by the first control device and data obtained from another control device, gathers data required by the other control device and transfers the gathered data to the other control device, and when a most recent version of the security program, to which the security program is to be updated, exists in relation to the second control device, transfers the most recent version of the security program to the second control device; and the second control device, having received the most recent version of the security program from the first control device, obtains the information indicating the current operating condition of the first control device and the information indicating the current operating condition of the vehicle from the first control device, specifies the current operating condition of the vehicle from a consistency between the information indicating the current operating condition of the first control device and the information indicating the current operating condition of the vehicle, and when the specified current operating condition matches a vehicle operating condition in which processing for updating the security program to the most recent version of the security program is possible, executes processing for updating the security program to the most recent version of the security program.

Further, a program update control method according to this invention is applied to a vehicle installed with a first control device and one or more second control devices connected communicably to the first control device in order to perform update processing on a security program that is implemented in the second control device for the purpose of preventing incorrect operations, and includes: a first step for generating information indicating a current operating condition of the first control device and information indicating a current operating condition of the vehicle on the basis of data detected by the first control device and data obtained from another control device; a second step for gathering data required by the other control device from the information generated in the first step and transferring the gathered data to the other control device; and a third step for transferring a most recent version of the security program, to which the security program is to be updated, to the second control device when the most recent version of the security program exists in relation to the second control device, the first, second, and third steps being implemented by the first control device; a fourth step for obtaining the information indicating the current operating condition of the first control device and the information indicating the current operating condition of the vehicle from the first control device after receiving the most recent version of the security program from the first control device, and specifying the current operating condition of the vehicle from a consistency between the information indicating the current operating condition of the first control device and the information indicating the current operating condition of the vehicle; and a fifth step for executing processing for updating the security program to the most recent version of the security program when the current operating condition specified in the fourth step matches a vehicle operating condition in which processing for updating the security program to the most recent version of the security program is possible, the fourth and fifth steps being implemented by the second control device.

With the program update control system and program update control method according to this invention, a security function implemented to ensure that the vehicle does not operate abnormally as a result of an incorrect operation can be updated at a timing at which incorrect operations are not performed. As a result, it is possible to obtain a program update control system and a program update control method with which a program for realizing a security function against incorrect operations in an in-vehicle network system can be updated at an appropriate timing corresponding to a characteristic of an ECU and so on.

DESCRIPTION OF THE PREFERRED EMBODIMENTS

Preferred embodiments of a program update control system and a program update control method according to this invention will be described below using the drawings.

First Embodiment

Figure 1:
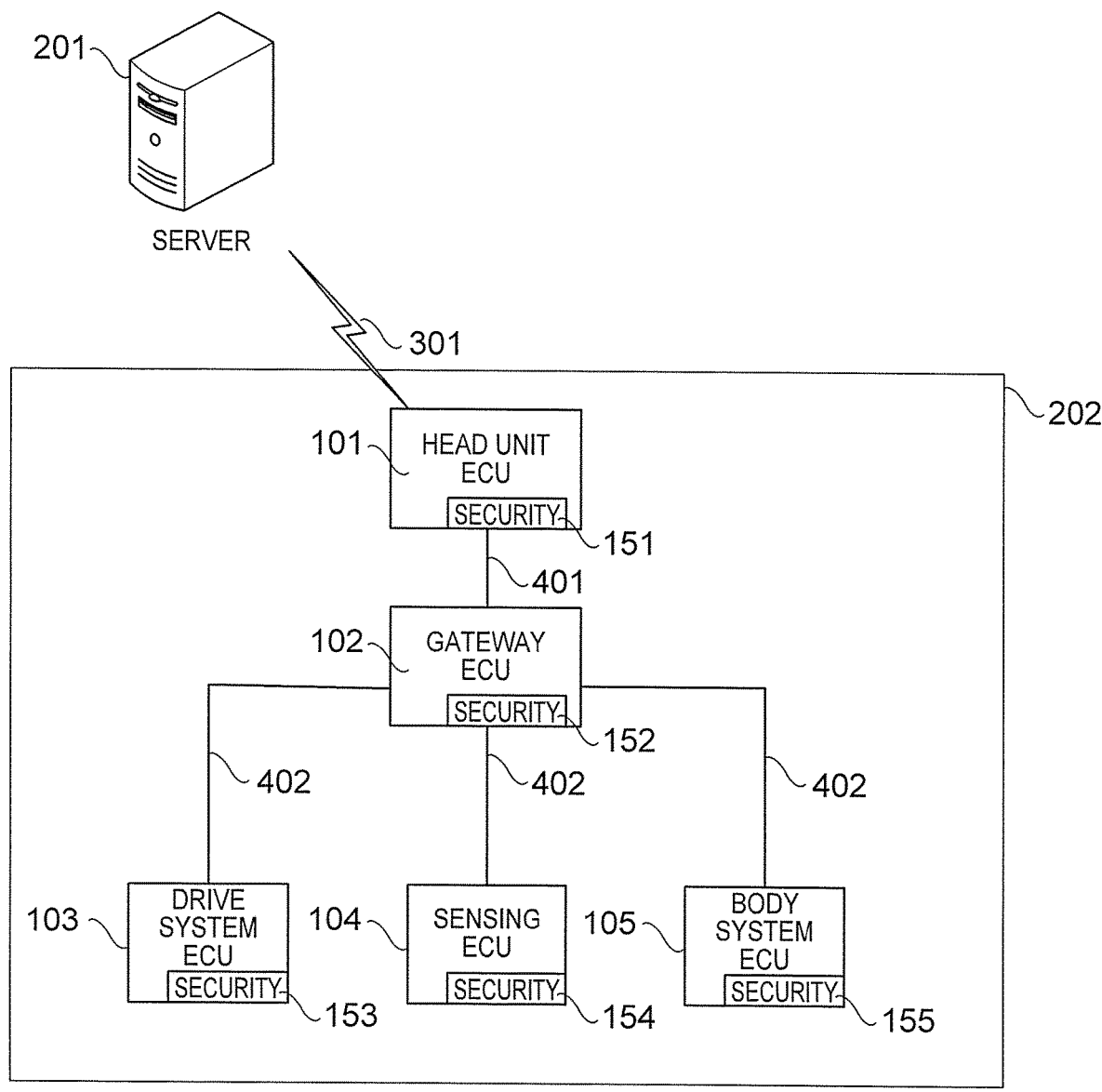
FIG. 1 is a schematic view showing a network configuration inside and outside a vehicle installed with a program update control system according to a first embodiment of this invention.

FIG. 1 is a schematic view showing a network configuration inside and outside a vehicle 202 installed with a program update control system according to a first embodiment of this invention. The vehicle 202 includes, as individual control devices, a head unit ECU 101, a gateway ECU 102, a drive system ECU 103, a sensing ECU 104, and a body system ECU 105.

A server 201 is provided outside the vehicle 202. The server 201 is connected to the head unit ECU 101 by wireless communication 301. The head unit ECU 101 and the gateway ECU 102 are connected by a high speed communication line 401. The gateway ECU 102 is connected respectively to the drive system ECU 103, the sensing ECU 104, and the body system ECU 105 by a low speed communication line 402.

Security measures 151 to 155 such as authentication of messages traveling along the various communication lines and access restrictions are taken by the respective ECUs 101 to 105 in accordance with the ECUs 101 to 105. Note that the network configuration shown in FIG. 1 is an example, and other configurations may be employed.

Next, operations and functions of the constituent elements shown in FIG. 1 will be described.

First, the server 201 will be described. The server 201 includes programs for the respective ECUs 101 to 105. Each program includes not only a currently installed version, but also an old version and a new version to which the current version is to be updated. The programs are stored in the server 201 by a manager, a management system, or the like for managing the server 201.

In a program update control system such as that shown in FIG. 1, the program in each of the ECUs may be updated as required to the new version of the program in order to respond to new threats and vulnerabilities. When the program of the ECU is to be updated, a program update for the ECU is transmitted to the head unit ECU 101 of the vehicle 202 from the server 201 via the wireless communication 301.

Next, the head unit ECU 101 will be described.

The head unit ECU 101 obtains the program update for the ECU from the server 201 via the wireless communication 301. Further, the head unit ECU 101 transfers the obtained program update to the gateway ECU 102. At this time, the head unit ECU 101 does not transfer a program update relating to the head unit ECU 101 itself.

Next, the gateway ECU 102 will be described.

The gateway ECU 102 gathers data required by the head unit ECU 101, the drive system ECU 103, the sensing ECU 104, and the body system ECU 105 from data obtained by the respective ECUs, and transfers the gathered data thereto.

For example, during travel, the gateway ECU 102 transfers information obtained from the sensing ECU 104 over the low speed communication line 402 to the drive system ECU 103. In response, the drive system ECU 103 determines values transferred from the gateway ECU 102, and implements operation changes.

Further, the gateway ECU 102 obtains the program update from the head unit ECU 101 over the high speed communication line 401. Furthermore, the gateway ECU 102 transfers the obtained program update to the update subject ECU connected thereto by the low speed communication line 402. At this time, the gateway ECU 102 does not transfer a program update relating to the gateway ECU 102 itself.

Next, the drive system ECU 103 will be described.

The drive system ECU 103 is an ECU for controlling steering, braking, and so on. Further, a security program 153 for preventing operations not intended by a driver or a control device, such as sudden acceleration or abrupt steering, from being implemented on the vehicle 202 as a result of an incorrect operation is implemented in the drive system ECU 103.

When the security program 153 of the drive system ECU 103 is to be updated, the drive system ECU 103 updates the security program 153 to a program update obtained from the gateway ECU 102 over the low speed communication line 402.

Next, the sensing ECU 104 will be described.

The sensing ECU 104 is an ECU for detecting conditions inside and outside the vehicle using cameras, radar, and so on. Further, a security program 154 for preventing manipulated images, reflection waves, and so on from being detected as a result of an incorrect operation is implemented in the sensing ECU 104.

When the security program 154 of the sensing ECU 104 is to be updated, the sensing ECU 104 updates the security program 154 to a program update obtained from the gateway ECU 102 over the low speed communication line 402.

Next, the body system ECU 105 will be described.

The body system ECU 105 is an ECU for controlling door locks, an immobilizer, windows, and so on. Further, a security program 155 for preventing theft of the vehicle 202 or ensuring that an invalid key for the vehicle 202 is not authenticated is implemented in the body system ECU 105.

When the security program 155 of the body system ECU 105 is to be updated, the body system ECU 105 updates the security program 155 to a program update obtained from the gateway ECU 102 over the low speed communication line 402.

Figure 2:
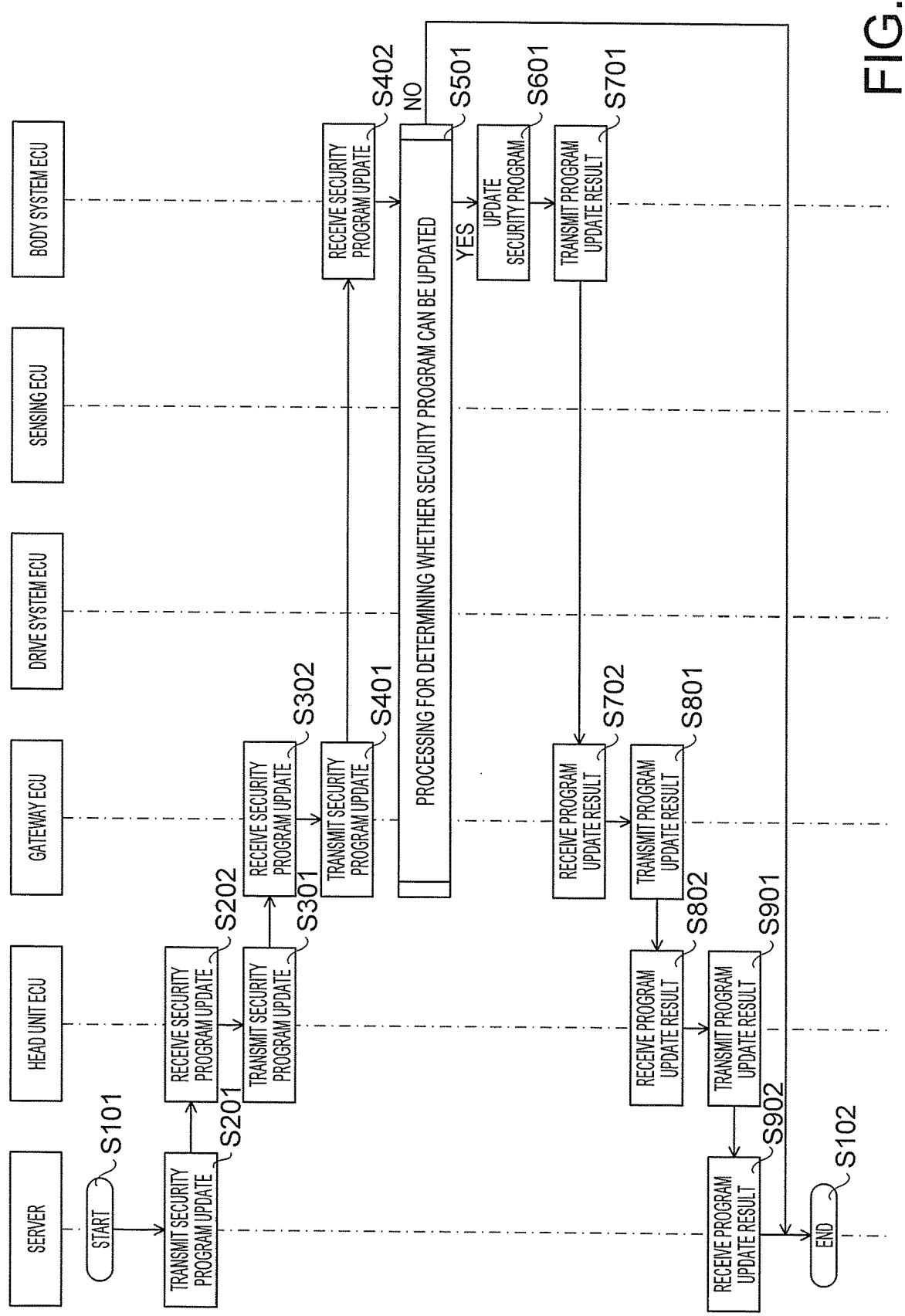
FIG. 2 is a flowchart showing a series of processes of a program updating method executed by the program update control system according to the first embodiment of this invention.
Figure 3:
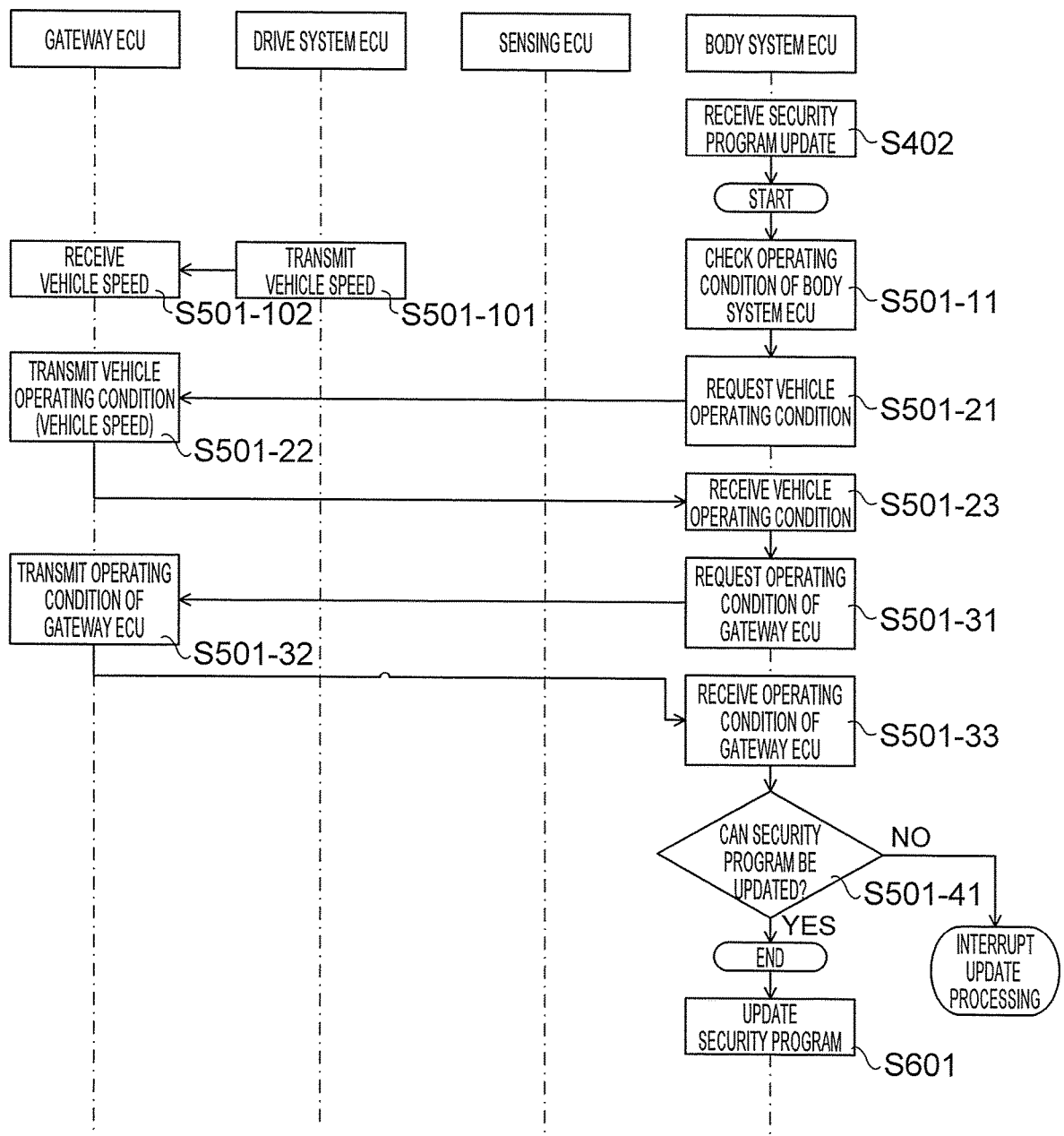
FIG. 3 is a flowchart showing a series of processes of the program updating method executed by the program update control system according to the first embodiment of this invention.

Next, a program update control method executed by the program update control system according to the first embodiment, having the above configuration, will be described in detail using flowcharts. FIGS. 2 and 3 are flowcharts showing a series of processes of the program update control method executed by the program update control system according to the first embodiment of this invention.

A case in which the program of the body system ECU 105 is updated will be described as a specific example using the flowchart shown in FIG. 2. A program update for the body system ECU 105 is stored in the server 201. In step S101, the server 201 starts program update processing. It is assumed here that the program update is specifically an updated version of the security program 155 implemented in the body system ECU 105 to respond to incorrect operations.

In step S201, the server 201 transmits the updated version of the security program 155 to the head unit ECU 101 in order to update the program of the body system ECU 105. In step S202, the head unit ECU 101 receives the security program 155 transmitted thereto from the server 201.

Next, in step S301, the head unit ECU 101 transmits the updated version of the security program 155 to the gateway ECU 102 in order to update the program of the body system ECU 105. In step S302, the gateway ECU 102 receives the security program 155 transmitted thereto from the head unit ECU 101.

Next, in step S401, the gateway ECU 102 transmits the most recent version of the security program 155 to the body system ECU 105 in order to update the program of the body system ECU 105. In step S402, the body system ECU 105 receives the security program 155 transmitted thereto from the gateway ECU 102.

In step S501, the body system ECU 105 determines whether or not the security program 155 implemented in the body system ECU 105 can be updated. When updating is possible, the routine advances to step S601, and when updating is not possible, the routine advances to step S102.

Next, the processing executed in step S501 will be described in detail using the flowchart shown in FIG. 3. Note that the steps shown in FIG. 3 are identified by sub-numbers appended to S501 via a hyphen.

In step S501-11, the body system ECU 105 checks the operating condition in order to determine whether or not the security program 155 can be updated. Here, the functions of the body system ECU 105, namely authenticating the validity of the key of the vehicle 202 and preventing theft of the vehicle 202, are executed while the vehicle 202 is stopped. Hence, the security program 155 may likewise be set so as to be activated only when the vehicle 202 is stopped. In other words, during travel, the security program 155 does not have to be activated, and may therefore be updated.

Next, in step S501-21, the body system ECU 105 issues a request to the gateway ECU 102, which is connected to the other ECUs via the high speed communication line 401 or the low speed communication line 402, to transmit the operating condition of the vehicle 202. Here, the operating condition specifically denotes conditions such as travel, stoppage, and charging.

The gateway ECU 102 can obtain a vehicle speed from the drive system ECU 103 and determine the operating condition from the obtained vehicle speed in advance in steps S501-101 and S501-102 before receiving the request from the body system ECU 105. Then, having received the request from the body system ECU 105, the gateway ECU 102 transmits the operating condition determined in step S501-102 to the body system ECU 105 in step S501-22.

Next, in step S501-23, the body system ECU 105 receives the operating condition transmitted thereto from the gateway ECU 102, whereupon the routine advances to step S501-31.

Next, in step S501-31, the body system ECU 105 issues a request to the gateway ECU 102 to transmit the operating condition of the gateway ECU 102 itself.

Next, in step S501-32, the gateway ECU 102 transmits the operating condition thereof to the body system ECU 105 in response to the request from the body system ECU 105.

Next, in step S501-33, the body system ECU 105 obtains the operating condition of the gateway ECU 102 from the gateway ECU 102.

Note that the operating condition of the gateway ECU 102, transmitted in step S501-32, is different information to the operating condition of the vehicle, transmitted in step S501-22.

During travel, the gateway ECU 102 executes processing to transfer information obtained from the sensing ECU 104 to the drive system ECU 103. At this time, radar detection values obtained by the gateway ECU 102 via the sensing ECU 104 vary successively.

Therefore, in addition to the operating condition of the vehicle 202, the gateway ECU 102 can successively obtain the conditions of the ECUs that are operative at that time. As a result, the gateway ECU 102 can transmit the most recent information obtained from the other ECUs at the present time to the body system ECU 105 as the operating condition of the gateway ECU 102 itself.

Next, in step S501-41, the body system ECU 105 determines whether or not the security program 155 can be updated by determining whether or not the vehicle 202 is traveling on the basis of the results received in relation to the operating condition of the vehicle 202 and the operating condition of the gateway ECU 102.

More specifically, the body system ECU 105 determines whether or not the operating condition of the vehicle 202, obtained in step S501-23, is consistent with the operating condition of the gateway ECU 102, obtained in step S501-33. When the information relating to the two operating conditions is consistent, the body system ECU 105 determines from the result whether or not the vehicle 202 is traveling.

When the two sets of information are inconsistent, however, the body system ECU 105 cannot determine accurately whether or not the vehicle 202 is traveling, and therefore the update processing is interrupted. The routine then advances to step S102, where the series of processes is terminated.

When the information is determined to be consistent and the vehicle 202 is determined to be traveling, the security program 155 can be updated, and therefore the routine advances to step S601. When the information is determined to be consistent but the vehicle 202 is determined to be stopped, on the other hand, the security program 155 cannot be updated, and therefore the routine advances to step S102, where the series of processes is terminated.

Next, returning to FIG. 2, in step S601, the body system ECU 105 updates the security program 155. Note that during the update, the pre-update security program remains inoperative.

Next, in step S701, the body system ECU 105 notifies the gateway ECU 102 that updating of the security program 155 of the body system ECU 105 is complete. In step S702, the gateway ECU 102 receives the notification of update completion from the body system ECU 105.

Next, in step S801, the gateway ECU 102 notifies the head unit ECU 101 that updating of the security program 155 of the body system ECU 105 is complete. In step S802, the head unit ECU 101 receives the notification of update completion from the gateway ECU 102.

Next, in step S901, the head unit ECU 101 notifies the server 201 that updating of the security program 155 of the body system ECU 105 is complete. In step S902, the server 201 receives the notification of update completion from the head unit ECU 101.

In step S102, the server 201 terminates the series of processes following completion or interruption of the program update processing.

By executing this series of processes, a security program that is implemented to ensure that the vehicle 202 does not operate abnormally as a result of an incorrect operation can be updated in the respective ECUs at a timing at which incorrect operations are not performed. As a result, the vehicle 202 can be protected from incorrect operations during updating of the security program, when the vehicle 202 is vulnerable to incorrect operations.

Note that in the first embodiment, a case in which the security program 155 of the body system ECU 105 is updated to the program update obtained via the head unit ECU 101 was described. However, this invention is not limited to program updating via this route.

Another configuration, such as a configuration in which the body system ECU 105 is rewritten by directly accessing the low speed communication line 402 via a DLC connector or the like, or a configuration in which the program update is transmitted directly to the body system ECU 105 from the server 201, may be employed to update the program.

Further, in the first embodiment, an example in which the security program of the body system ECU 105 is updated was described, but similar update procedures can be applied to the other ECUs.

For example, functions that are activated while the vehicle 202 travels are implemented in the drive system ECU 103. Therefore, using means for confirming that the vehicle 202 is not traveling, or in other words that the vehicle 202 is stopped, a security program that is implemented to ensure that the vehicle 202 does not operate abnormally while traveling as a result of an incorrect operation can be updated at a timing at which incorrect operations are not performed.

Furthermore, in the first embodiment, the specific example shown in FIG. 1 was described as the network configuration, but this invention may be applied to a network configuration other than that shown in FIG. 1. The features of this invention can be applied to any network configuration in which a security program is rewritten.

Moreover, in the first embodiment, the determination as to whether or not updating is possible is made after the body system ECU 105 serving as the update subject ECU receives the program update, but this invention is not limited to this procedure, and instead, the program update may be received after the determination as to whether or not updating is possible.

Second Embodiment

Numerals in the drawings that are identical to the first and third embodiments denote components having identical basic functions. The following description will focus on additional functions of the second embodiment.

The head unit ECU 101 according to the second embodiment is capable of obtaining the information relating to the gateway ECU 102 and the information relating to the respective ECUs, which can be obtained by the gateway ECU 102 over the low speed communication line 402, from the gateway ECU 102 over the high speed communication line 401.

Accordingly, the head unit ECU 101 generates driving history information relating to the driver or the vehicle itself by associating the information relating to the respective ECUs 102 to 105 with position information indicating the position of the vehicle 202, peripheral facility information, and time information, which are detected by the head unit ECU 101 itself, and stores the driving history information in a storage unit.

Further, the head unit ECU 101 predicts a subsequent route and a subsequent operation to be taken by the driver or the vehicle itself on the basis of past driving history information as well as position information and peripheral facility information obtained in relation to the vehicle 202 using the current time and map information. For example, when the driver returns to the vicinity of his/her home several hours after departing for a destination away from home, it may be assumed that the vehicle 202 will be parked.

Furthermore, when a security program update for one of the ECUs provided in the vehicle 202 exists in the server 201, the head unit ECU 101 transmits the security program update to the update subject ECU.

Figure 4:
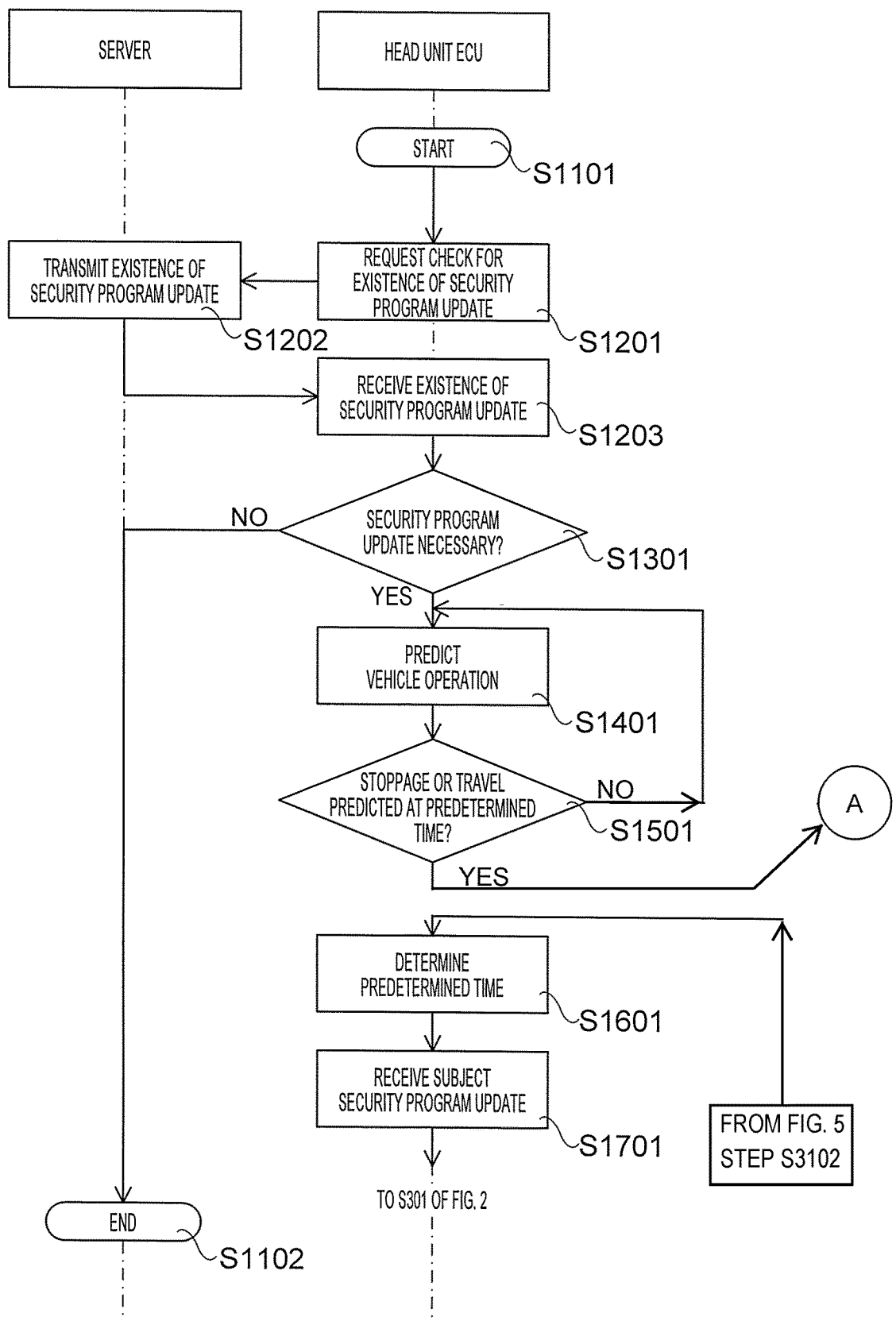
FIG. 4 is a flowchart showing a series of processes relating to a program update timing, executed by a program update control system according to a second embodiment of this invention.

A program update control method executed by the program update control system according to the second embodiment, having the above configuration, will now be described in detail using a flowchart. FIG. 4 is a flowchart showing a series of processes relating to the program update timing, executed by the program update control system according to the second embodiment of this invention.

In step S1101, the head unit ECU 101 starts the control method according to the second embodiment.

Next, in step S1201, the head unit ECU 101 checks whether or not any updates for the security programs of the ECUs provided in the vehicle 202 exist in the server 201.

Next, in step S1202, the server 201 checks whether or not any program updates to be applied to the security programs of the ECUs provided in the vehicle 202 exist therein, and transmits the result of the check to the head unit ECU 101.

Next, in step S1203, the head unit ECU 101 receives the result of the check. Next, in step S1301, the head unit ECU 101, having received the result of the check in step S1203, determines whether or not any of the security programs need to be updated.

When the head unit ECU 101 determines that an update is required, the routine advances to step S1401. When an update is not required, on the other hand, the routine advances to step S1102, where the series of processes is terminated.

Next, in step S1401, the head unit ECU 101 predicts the subsequent route and operation to be taken by the driver or the vehicle itself on the basis of the past driving history information as well as the position information and peripheral facility information obtained in relation to the vehicle 202 using the current time and map information.

Next, in step S1501, the head unit ECU 101 predicts the condition of the vehicle 202, i.e. whether the vehicle 202 will be stopped or traveling at a preset time t in the future, on the basis of the prediction result obtained in step S1401.

Here, the head unit ECU 101 selects either that the vehicle 202 will be stopped or that the vehicle 202 will be traveling at the time t and thereafter. When the condition of the vehicle 202 that is required to update the security program to be updated matches the selected condition, the routine advances to step S1601. When the conditions do not match, the routine returns to step S1401, where the head unit ECU 101 predicts the vehicle operation again.

In other words, when the head unit ECU 101 predicts that the vehicle 202 will be traveling at the time t and thereafter, the head unit ECU 101 determines whether or not the security program to be updated is a security program that can be updated during travel and is required during a stoppage.

Further, when the head unit ECU 101 predicts that the vehicle 202 will be stopped at the time t and thereafter, the head unit ECU 101 determines whether or not the security program to be updated is a security program that can be updated during a stoppage and is required during travel.

Furthermore, at this time, the head unit ECU 101 calculates a time $t_{update}$ at which to start rewriting the ECU for which a security program update exists. The time $t_{update}$ is earlier than the aforementioned time t, and is calculated on the basis of an amount of time required to update the program as a time for completing an update preparation operation before the time t.

Next, in step S1601, the head unit ECU 101 checks whether or not the current time matches $t_{update}$, and when the times match, determines that the update timing has arrived. The routine then advances to step S1701.

Next, in step S1701, the head unit ECU 101, having predicted that the vehicle 202 will be stopped at the time t upon reception of the prediction result obtained in step S1501, selects an ECU having a security program that can be updated during a stoppage. The drive system ECU 103 and so on may be cited as examples of ECUs having security programs that are required during travel but can be updated during a stoppage.

Further, having predicted that the vehicle 202 will be traveling at the time t upon reception of the prediction result in step S1501, the head unit ECU 101 selects an ECU having a security program that can be updated during travel. The body system ECU 105 may be cited as an example of an ECU having a security program that is required during a stoppage but can be updated during travel.

At this time, the head unit ECU 101 confirms that the ECU selected in step S1701 matches the ECU having the security program to be updated, as checked in step S1201. Following confirmation, the head unit ECU 101 receives the most recent version of the security program relating to the selected ECU from the server 201.

The routine then advances to step S301 in FIG. 2, where the head unit ECU 101 transmits the most recent version of the security program, received from the server 201, to the selected ECU before the time t. From step S301 onward, identical processing to that of FIG. 2 is performed. FIG. 2 shows a case in which the body system ECU 105 is selected.

By controlling the timing at which the most recent version of the security program is downloaded in the manner described above, each of the ECUs can be updated to the most recent versions of the security programs at a timing when updating is possible and immediately before entering a condition in which incorrect operations may be executed. Once the most recent version of the security program has been downloaded, it is possible to respond to vulnerabilities not covered by the previous version of the security program.

Note that in the second embodiment, a case in which the security program 155 of the body system ECU 105 is updated to the program update obtained via the head unit ECU 101 was described, but this invention is not limited to program updating via this route.

Another configuration, such as a configuration in which the body system ECU 105 is rewritten by directly accessing the low speed communication line 402 via a DLC connector or the like, or a configuration in which the program update is transmitted directly to the body system ECU 105 from the server 201, may be employed to update the program.

Further, in the second embodiment, an example in which the security program of the body system ECU 105 is updated was described, but similar update procedures can be applied to the other ECUs.

Furthermore, in the second embodiment, the example shown in FIG. 1 was described as the network configuration, but this invention may be applied to a network configuration other than that shown in FIG. 1. The features of this invention can be applied to any network configuration in which a security program is rewritten.

Moreover, in the second embodiment, a case in which the head unit ECU 101 first checks the server 201 for any security program updates in step S1201 was described, but this invention is not limited to this procedure, and instead, the server 201 may detect the existence of a security program update and notify the head unit ECU 101 thereof.

Third Embodiment

Numerals in the drawings that are identical to the first and second embodiments denote components having identical basic functions. The following description will focus on additional functions of the third embodiment.

The head unit ECU 101 according to the third embodiment is configured to be capable of transmitting a display instruction to an instrument panel LED 106 formed by installing an LED for notifying the driver of a predetermined condition in an instrument panel.

The instrument panel LED 106 is controlled from the head unit ECU 101. The head unit ECU 101 is capable of displaying either a condition in which the security program can be updated or a condition in which the security program cannot be updated recognizably.

Figure 5:
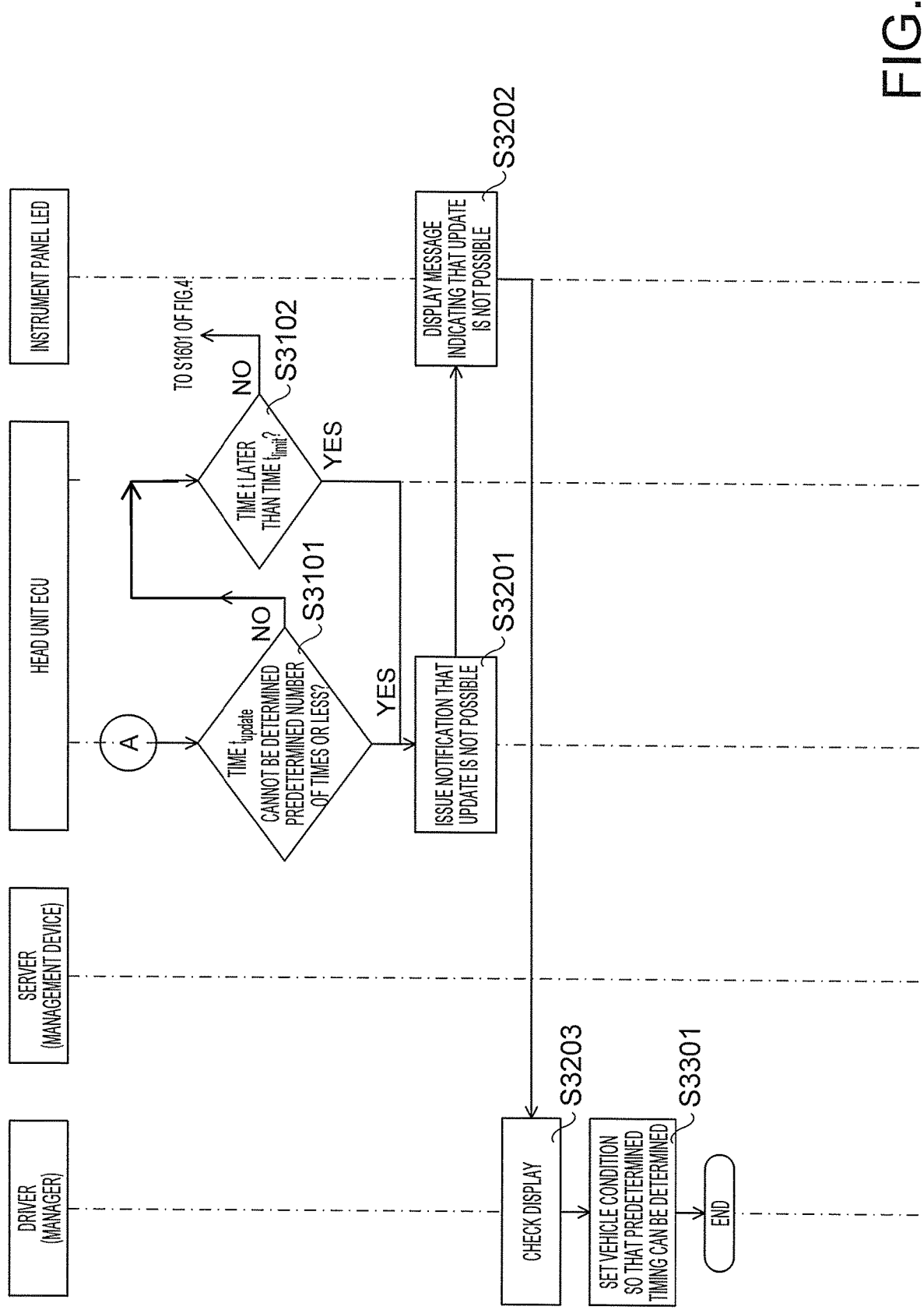
FIG. 5 is a flowchart showing a series of processes relating to notification display, executed by a program update control system according to a third embodiment of this invention.

A program update control method executed by the program update control system according to the third embodiment, having the above configuration, will now be described in detail using a flowchart. FIG. 5 is a flowchart showing a series of processes relating to notification display, executed by the program update control system according to the third embodiment of this invention. Note that circled characters A and B in FIG. 5 indicate connections to circled characters A and B shown in FIG. 4.

In step S3101, the head unit ECU 101 determines whether or not it has been impossible to implement the determination processing of step S1501 of the second embodiment, shown in FIG. 4, a predetermined number of times set in advance. When the head unit ECU 101 determines that the determination processing has not been implemented the predetermined number of times, the routine advances to step S3201.

In step S3102, the head unit ECU 101 determines whether the time t used in step S1501 of the second embodiment, shown in FIG. 4, is earlier or later than a time $t_{limit}$. The time $t_{limit}$ is set by the head unit ECU 101 on the basis of the likelihood that an envisaged threat would materialize as a result of an incorrect operation or a degree to which the vehicle 202 would be affected by such a threat if the most recent version of the security program were not installed. The time $t_{limit}$ is set to be steadily closer to a current time $t_{current}$ as the likelihood or the degree of the threat increases.

When the head unit ECU 101 determines that the time t is later than the time $t_{limit}$, the routine advances to step S3201. When the head unit ECU 101 determines that the time t is not later than the time $t_{limit}$, on the other hand, the routine advances to the processing of step S1601 onward in FIG. 4.

When the routine advances to step S3201, the head unit ECU 101 notifies the instrument panel LED 106 that the security program cannot be updated because either the update timing cannot be determined or the update timing is later than the time $t_{limit}$.

Next, in step S3202, a predetermined LED of the instrument panel LED 106 is switched ON so as to display the fact that the security program cannot be updated recognizably, and as a result, the driver of the vehicle 202 is notified thereof.

In step S3203, the driver confirms the content of the displayed notification. Further, in step S3301, the driver modifies the condition of the vehicle 202 on the basis of the confirmation result of the notification content so that the security program can be updated. For example, when the program update is for the security program of the drive system ECU 103 and the driver learns from the displayed content that the security program cannot be updated, the driver stops the vehicle 202 so that the security program can be updated.

By involving the driver in the processing in the manner described above, the security program can be updated earlier in a case where it is not clear from the driving history when the security program update will be applied or a case where application of the security program update is delayed. As a result, the most recent version of the security program can be applied early, thereby realizing protection from malevolent incorrect operations.

Note that in the third embodiment, the driver is notified of a condition in which updating is impossible, but the notification subject is not limited to the driver. For example, in the case of a self-driving vehicle or the like in which a driver is not present, the notification subject may be another ECU (in other words, an in-vehicle information management device) provided in the vehicle to manage and manipulate the driving condition of the vehicle, or a management device (in other words, an external information management device) such as a server that can monitor and manipulate the driving condition of the vehicle from the exterior of the vehicle.

What is claimed is:

1. A vehicle program update method of a vehicle controller, the vehicle program update method comprising:
   receiving, by a first controller from among a plurality of controllers in a vehicle, an update for a security program that is being executed by one of the plurality of controllers;
   in response to the receiving of the update of the security program, executing, by the first controller, following operations:
   predicting, a travel condition of the vehicle at a preset time in the future, based on past driving history, wherein the travel condition includes a state of the vehicle which indicates that the vehicle is stopped or the vehicle is traveling;
   comparing the predicted travel condition with a required condition for applying the update;
   in response to a match of the predicted travel condition and the required condition for the update, checking whether a number of times an installation of the update was attempted in the past and a time by which the update needs to be installed are within ranges preset by a user;
   in response to the number of times the installation of the update was attempted and the time by which the update needs to be installed are both satisfied, transmitting the update to a gateway controller;
   in response to receiving the update, transmitting the update to a target controller, by the gateway controller, wherein the target controller is one or more of the plurality of controllers which install the update of the security program; and
   in response to receiving the update, installing the update of the security program and transmitting the results of the update to the gateway controller, by the target controller, which in turn transmitting the results to the first controller.

2. The method according to claim 1, wherein:
   an operating state of the vehicle is one of a moving state, a stop state, and a charging state,
   the method further comprises: receiving first information indicating an operating state of the gateway controller, and determining whether the first information corresponds to second information indicating the operating state of the vehicle, and
   the first information indicates whether the first controller executes at least one operation associated with one of: the moving state of the vehicle, the stop state of the vehicle, and the charging state of the vehicle.

3. The method according to claim 2, wherein the second information is obtained by the gateway controller from data detected by at least one second controller of the vehicle connected to the gateway controller.

4. The method according to claim 3, wherein the at least one second controller comprises a driving system controller which transmits a speed of the vehicle to the gateway controller,
   wherein the second information comprises the speed of the vehicle obtained from the driving system controller,
   wherein the first controller comprises a body system controller, and
   wherein the required condition of the vehicle for the update of the security program of the body system controller is a moving state of the vehicle.

5. A vehicle program update system of a vehicle, the vehicle program update system comprising a plurality of controllers,
   wherein the plurality of controllers comprises a first controller, a gateway controller, a target controller,
   wherein the first controller is configured to:
   receive an update for a security program that is being executed by one of the plurality of controllers;
   in response to the receiving of the update of the security program, executes following operations:
   predicting, a travel condition of the vehicle at a preset time in the future, based on past driving history, wherein the travel condition includes a state of the vehicle which indicates that the vehicle is stopped or the vehicle is traveling;
   comparing the predicted travel condition with a required condition for applying the update;
   in response to a match of the predicted travel condition and the required condition for the update, checking whether a number of times an installation of the update was attempted in the past and a time by which the update needs to be installed are within ranges preset by a user;
   in response to the number of times the installation of the update was attempted and the time by which the update needs to be installed are both satisfied, transmitting the update to the gateway controller;
   wherein the gateway controller is configured to:

in response to receiving the update, transmitting the update to the target controller, wherein the target controller is one or more of the plurality of controllers which install the update of the security program, and wherein the target controller is configured to:
in response to receiving the update, installing the update of the security program and transmitting the results of the update to the gateway controller, and in turn transmitting the results to the first controller.

6. The vehicle program update system of claim 5, wherein an operating state of the vehicle is one of a moving state, a stop state, and a charging state, the first controller receives first information indicating an operating state of the gateway controller, and determines whether the first information corresponds to second information indicating the operating state of the vehicle, and the first information indicates whether the first controller executes at least one operation associated with one of: the moving state of the vehicle, the stop state of the vehicle, and the charging state of the vehicle.

7. The vehicle program update system of claim 6, wherein the gateway controller is further configured to obtain the second information from data detected by at least one second controller of the vehicle connected to the gateway controller.

8. The vehicle program update system of claim 7, wherein the at least one second controller comprises a driving system controller which transmits a speed of the vehicle to the gateway controller,
wherein the second information comprises the speed of the vehicle obtained from the driving system controller,
wherein the first controller comprises a body system controller, and
wherein the required condition of the vehicle for the update of the security program of the body system controller is a moving state of the vehicle.

* * * * *